United States Patent
Jo et al.

(10) Patent No.: US 9,429,780 B2
(45) Date of Patent: Aug. 30, 2016

(54) LIQUID CRYSTAL DISPLAY DEVICE COMPRISING A PLURALITY OF VERTICAL AND HORIZONTAL GATE LINES THAT DIRECTLY CONTACT A SAME UPPER SURFACE OF A SAME LAYER

(71) Applicant: LG DISPLAY CO., LTD., Seoul (KR)

(72) Inventors: Jae Hyung Jo, Busan (KR); Chul Nam, Seoul (KR); Jong Sin Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 78 days.

(21) Appl. No.: 14/101,818

(22) Filed: Dec. 10, 2013

(65) Prior Publication Data

US 2014/0168552 A1 Jun. 19, 2014

(30) Foreign Application Priority Data

Dec. 13, 2012 (KR) .................. 10-2012-0145542

(51) Int. Cl.
*G02F 1/1345* (2006.01)
*G02F 1/133* (2006.01)
*G02F 1/1343* (2006.01)
*G02F 1/1362* (2006.01)

(52) U.S. Cl.
CPC ......... *G02F 1/13306* (2013.01); *G02F 1/1345* (2013.01); *G02F 1/134363* (2013.01); *G02F 1/136286* (2013.01); *G02F 2001/13456* (2013.01); *G02F 2001/13629* (2013.01)

(58) Field of Classification Search
CPC .................. G02F 1/13306; G02F 2001/13456; G02F 1/133

USPC .................................................. 349/149–152
See application file for complete search history.

(56) References Cited

U.S. PATENT DOCUMENTS

| | | | |
|---|---|---|---|
| 2003/0030381 | A1 | 2/2003 | Yamazaki et al. |
| 2007/0023752 | A1* | 2/2007 | Nakamura ........ G02F 1/136213 257/59 |
| 2009/0279013 | A1* | 11/2009 | Kang .................. G02F 1/13338 349/48 |
| 2010/0033664 | A1 | 2/2010 | Lee |

(Continued)

FOREIGN PATENT DOCUMENTS

| | | |
|---|---|---|
| CN | 1407373 A | 4/2003 |
| CN | 101487962 A | 7/2009 |
| JP | 11-305681 A | 11/1999 |
| JP | 2010-072363 | 4/2010 |

OTHER PUBLICATIONS

Office Action dated Dec. 18, 2015 for corresponding Chinese Patent Application No. 201310674677.9, 6 pages.

*Primary Examiner* — Paul Lee
(74) *Attorney, Agent, or Firm* — Brinks Gilson & Lione

(57) ABSTRACT

An LCD device includes a plurality of first gate lines and a plurality of data lines vertically formed in a liquid crystal panel, a plurality of second gate lines horizontally formed in the liquid crystal panel, and a plurality of driving ICs disposed in an upper or lower non-display area of the liquid crystal panel, connected to the plurality of first gate lines to supply a scan signal, and connected to the plurality of data lines to supply data voltages. The plurality of first gate lines and the plurality of second gate lines are electrically connected to each other in pairs through a contact in an overlapping area therebetween, and the plurality of first gate lines and the plurality of data lines are formed on different layers.

15 Claims, 13 Drawing Sheets

(56) References Cited

U.S. PATENT DOCUMENTS

| | | | |
|---|---|---|---|
| 2010/0066967 A1* | 3/2010 | Takahashi | G02F 1/136286 349/143 |
| 2010/0079717 A1* | 4/2010 | Park et al. | 349/152 |
| 2010/0309421 A1* | 12/2010 | Gotoh et al. | 349/152 |
| 2011/0279418 A1* | 11/2011 | Han | G02F 1/136286 345/204 |

* cited by examiner

LIQUID CRYSTAL DISPLAY DEVICE COMPRISING A PLURALITY OF VERTICAL AND HORIZONTAL GATE LINES THAT DIRECTLY CONTACT A SAME UPPER SURFACE OF A SAME LAYER

CROSS-REFERENCE TO RELATED APPLICATIONS

This application claims the benefit of priority of Korean Patent Application No. 10-2012-0145542 filed on Dec. 13, 2012, which is hereby incorporated by reference as if fully set forth herein.

BACKGROUND

1. Field of the Disclosure

The present disclosure relates to a flat panel display device, and more particularly, to a liquid crystal display (LCD) device with a reduced bezel size and an enhanced aesthetic design appearance.

2. Discussion of the Related Art

With the advance of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, organic light emitting diode (OLED) display devices, etc. are developed as flat panel display devices.

In such FPD devices, the LCD devices are being continuously expanded in application field because the LCD devices are easily manufactured due to the advance of manufacturing technology and realize drivability of a driver, low power consumption, a high-quality image, and a large screen.

FIG. 1 is a view schematically illustrating a related art LCD device, and FIG. 2 is a view schematically illustrating a pixel structure of the related art LCD device.

Referring to FIGS. 1 and 2, the related art LCD device includes a liquid crystal panel in which a plurality of pixels are arranged in a matrix type, a driving circuit unit that drives the liquid crystal panel, a backlight unit (not shown) that supplies light to the liquid crystal panel, and a bezel (not shown) that is formed to surround the liquid crystal panel and the driving circuit unit.

The liquid crystal panel includes a lower substrate (TFT array substrate) in which the plurality of pixels and a plurality of lines for driving the pixels are provided, an upper substrate (color filter array substrate) in which a plurality of color filters and a plurality of black matrixes are formed, and a liquid crystal layer disposed between the two substrates.

A plurality of gate lines and a plurality of data lines are formed to intersect each other in the lower substrate of the liquid crystal panel, and the plurality of pixels are respectively formed in a plurality of areas in which the gate lines and the data lines intersect each other. A thin film transistor (TFT), a switching element, is formed in each of the pixels, and a pixel electrode and a common electrode for applying an electric field are formed in each of the pixels.

The liquid crystal panel includes a display area 10 that displays an image and a non-display area that cannot display an image.

A data driver 40 is connected to an upper non-display area of the liquid crystal panel. A pad area, in which a plurality of pads receiving external signals for driving the respective pixels are provided, is formed in an outer non-display area of the lower substrate of the liquid crystal panel, and a link line that links a corresponding pad to a corresponding TFT and electrode is formed in plurality.

FIG. 3 is a sectional view illustrating the non-display area of the liquid crystal panel of the related art.

Referring to FIG. 3, a seal 30 is formed in an outer portion (i.e., non-display area) of an active area in which the plurality of pixels are formed, and the upper substrate 1 and the lower substrate 2 are coupled to each other with the seal 30.

A gate-in panel (GIP) type, in which a built-in shift register is disposed in the lower substrate 2, is applied for reducing the manufacturing cost of the LCD device due to the driving circuit unit adhered to the liquid crystal panel and reducing a volume and a weight. By disposing a gate driver in each of left and right non-display areas of the liquid crystal panel in the GIP type, the pad area and link lines for applying signals to the respective gate lines of the liquid crystal panel are removed.

The gate driver and the data driver receive different driving signals from a timing controller mounted on a printed circuit board (PCB) 50 and receive a driving voltage supplied from a power supply to thereby be driven.

The GIP type gate driver is disposed in each of the left and right non-display areas of the lower substrate 2. In FIG. 3, only the gate driver disposed at a left side of the lower substrate 2 is illustrated.

The GIP type gate driver includes a common voltage link area 22 receiving a common voltage (Vcom), a ground (GND) link area 24, and a shift register logic area 26 that generates a scan signal for turning on the TFTs of the liquid crystal panel.

Comparing with a type in which a gate driver manufactured as a separate chip is connected to the liquid crystal panel, the manufacturing cost of the LCD device can be reduced by applying the GIP type gate driver, and a volume and a weight can be reduced. However, bezel sizes of the left and right sides of the liquid crystal panel increase.

As illustrated in FIG. 3, the ground link area 24 overlaps the seal 30, for increasing a bezel size. However, the common voltage link area 22 is formed to have a width of about 1 mm, and the shift register logic area 26 of the GIP type gate driver is formed to have a width of 5 mm to 6 mm. For this reason, a left bezel width and a right bezel width are formed at 7 mm to 8 mm, and thus, there is a limitation in reducing a size, causing a reduction in an aesthetic design appearance.

In the GIP type, there is a limitation in decreasing a width of each line and an interval between adjacent lines to a certain level or less, and thus, there is a difficulty in realizing a narrow bezel. When the width of each line and the interval between the adjacent lines are reduced for decreasing a bezel size, a line resistance increases, and thus, a signal is distorted and the shift register logic malfunctions. Especially, in the GIP type, since it is impossible to remove lines, it is difficult to realize an ideal narrow bezel, and moreover, it is impossible to realize a borderless panel.

To solve the problems, a structure was proposed in which the TFT array substrate and the color filter array substrate are switched in disposed position, and the TFT array substrate is disposed at an upper side. However, external light is reflected by a plurality of lines formed in the TFT array substrate, causing a reduction in visibility of an image.

SUMMARY

An LCD device includes: a plurality of first gate lines and a plurality of data lines vertically formed in a liquid crystal panel; a plurality of second gate lines horizontally formed in the liquid crystal panel, the plurality of second gate lines and the plurality of first gate lines being formed on different layers; and a plurality of driving ICs disposed in an upper or lower non-display area of the liquid crystal panel, connected to the plurality of first gate lines to supply a scan signal, and connected to the plurality of data lines to supply data voltages, wherein, the plurality of first gate lines and the plurality of second gate lines are electrically connected to each other in pairs through a contact in an overlapping area therebetween, and the plurality of first gate lines and the plurality of data lines are formed on different layers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE EXEMPLARY EMBODIMENTS

Figure 1:
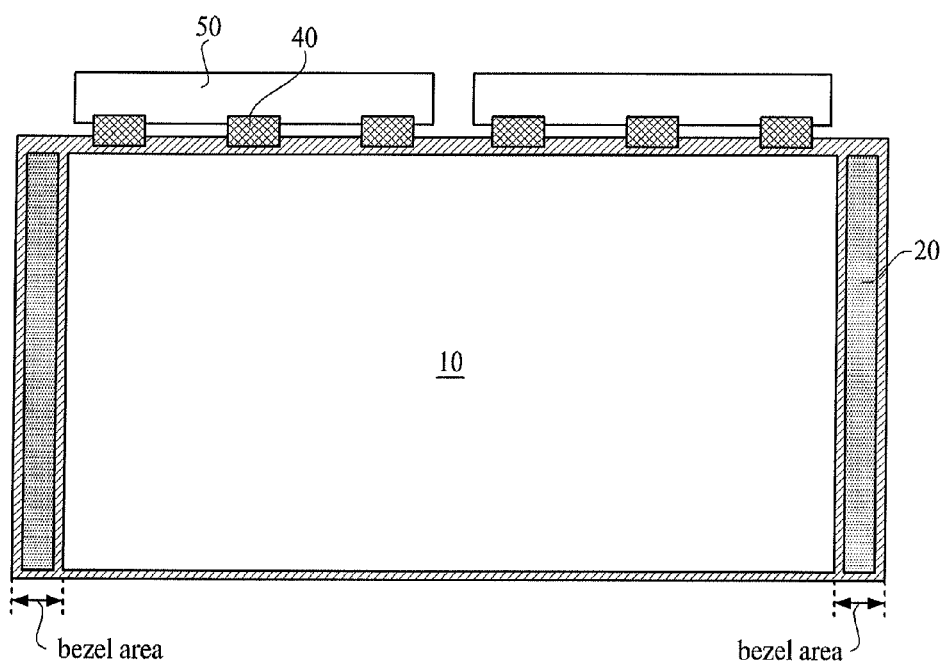
FIG. 1 is a view schematically illustrating a related art LCD device.
Figure 2:
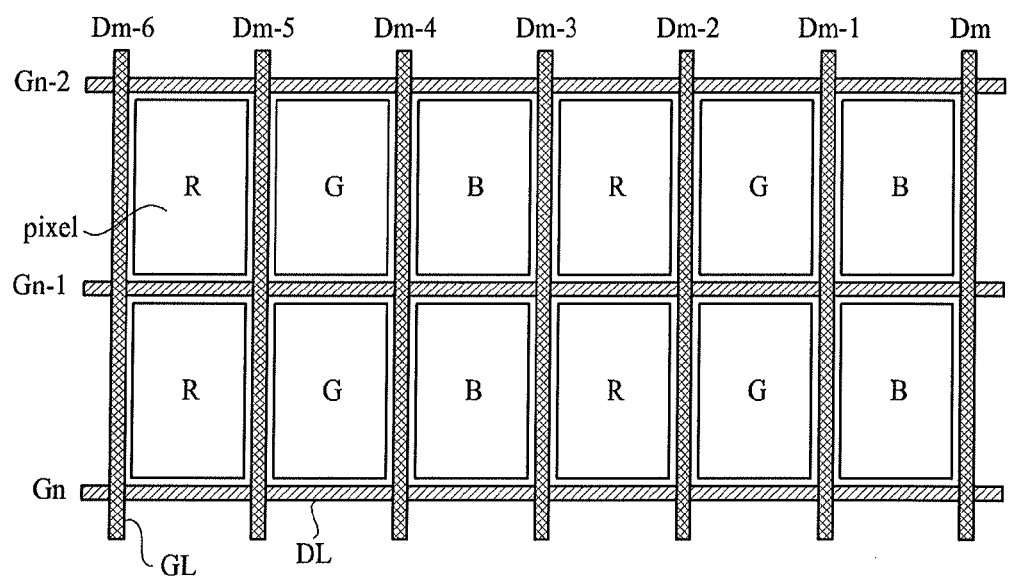
FIG. 2 is a view schematically illustrating a pixel structure of the related art LCD device.
Figure 3:
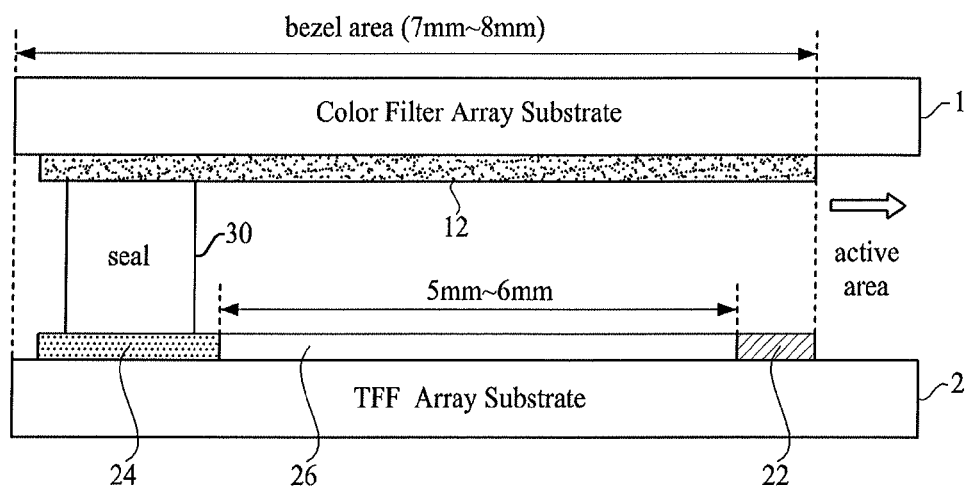
FIG. 3 is a sectional view illustrating a non-display area of a related art liquid crystal panel.

In the specification, although illustrated in the drawing, it is noted that like reference numerals denote like elements in appreciating the drawings.

The terms described in the specification should be understood as follows. As used herein, the singular forms "a", "an" and "the" are intended to include the plural forms as well, unless the context clearly indicates otherwise. The terms first and second are for differentiating one element from the other element, and these elements should not be limited by these terms.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover a case where a third structure is disposed therebetween.

LCD devices have been variously developed in a twisted nematic (TN) mode, a vertical alignment (VA) mode, an in-plane switching (IPS) mode, and a fringe field switching (FFS) mode according to a scheme of adjusting the alignment of liquid crystal.

Among such modes, the IPS mode and the FFS mode are modes in which a plurality of pixel electrodes and a common electrode are arranged on a lower substrate, thereby adjusting the alignment of liquid crystal with electric fields between the pixel electrodes and the common electrode. An LCD device according to an embodiment of the present invention may be applied irrespective of modes, but the IPS mode will be described as an example.

Hereinafter, an LCD device according to an embodiment of the present invention will be described in detail with reference to the accompanying drawings.

The main contents of the present invention are to reduce a bezel size of an LCD device. Therefore, an instrument irrelevant to a bezel and a backlight unit supplying light to a liquid crystal panel may not be illustrated, and their detailed description may not be provided.

Figure 4:
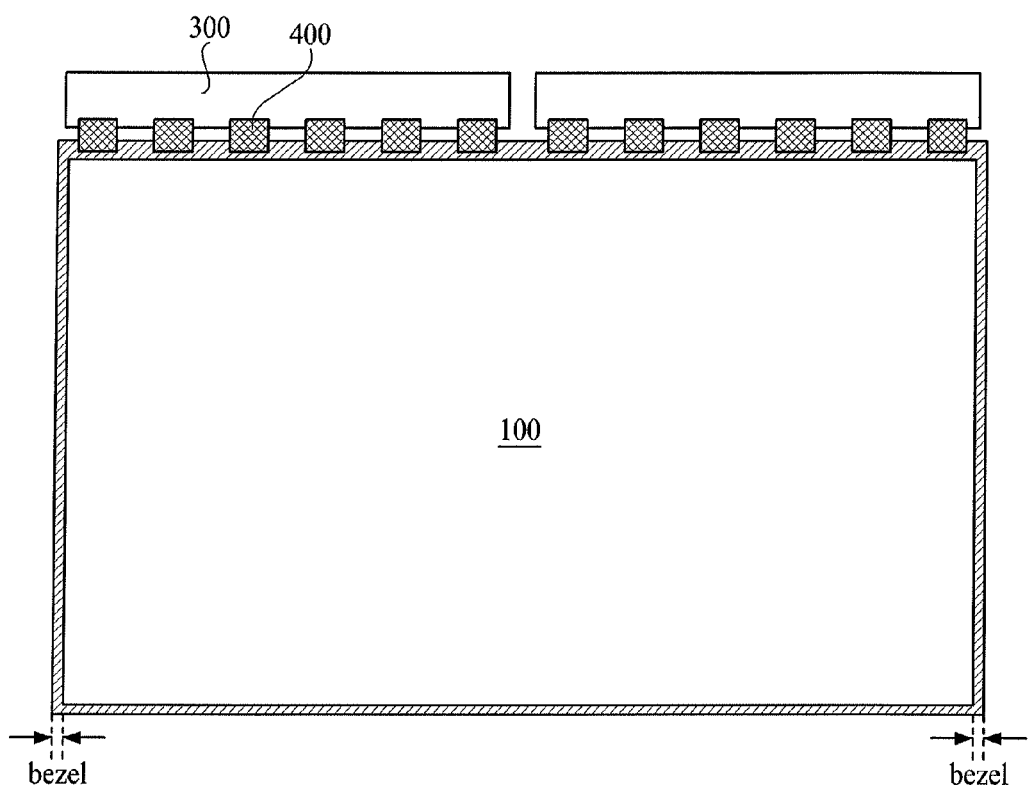
FIG. 4 is a view schematically illustrating an LCD device according to an embodiment of the present invention.

FIG. 4 is a view schematically illustrating an LCD device according to an embodiment of the present invention.

Referring to FIG. 4, the LCD device according to an embodiment of the present invention includes a liquid crystal panel 100 in which a plurality of pixels are arranged in a matrix type, a plurality of driving ICs 400 for driving the liquid crystal panel 100, a printed circuit board (PCB) 300 on which a control unit supplying a control signal for driving the plurality of driving ICs 400 and a power supply generating driving power are mounted, a backlight unit that supplies light to the liquid crystal panel 100, and a bezel and an external case that are provided to surround the liquid crystal panel 100 and a driving circuit unit.

Figure 5:
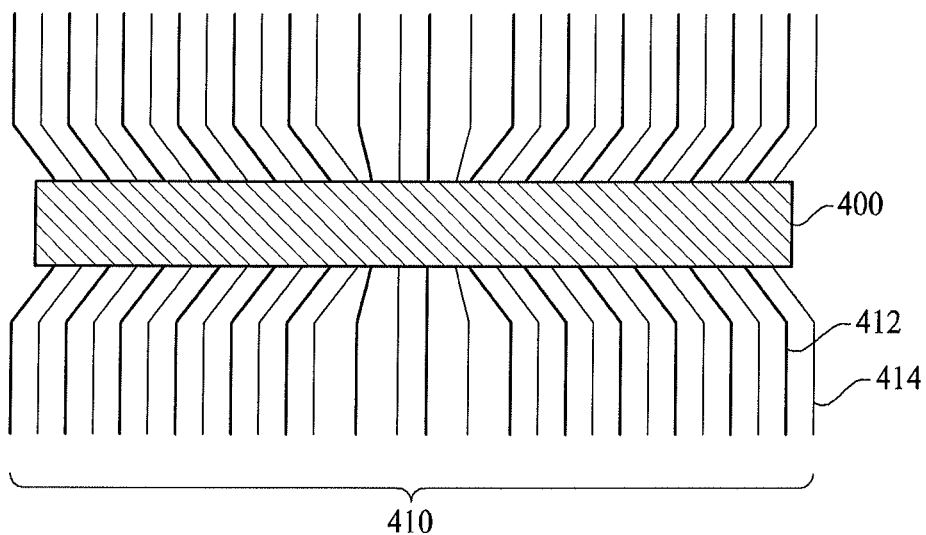
FIG. 5 is views illustrating a driving IC of the LCD device according to an embodiment of the present invention.
Figure 5:
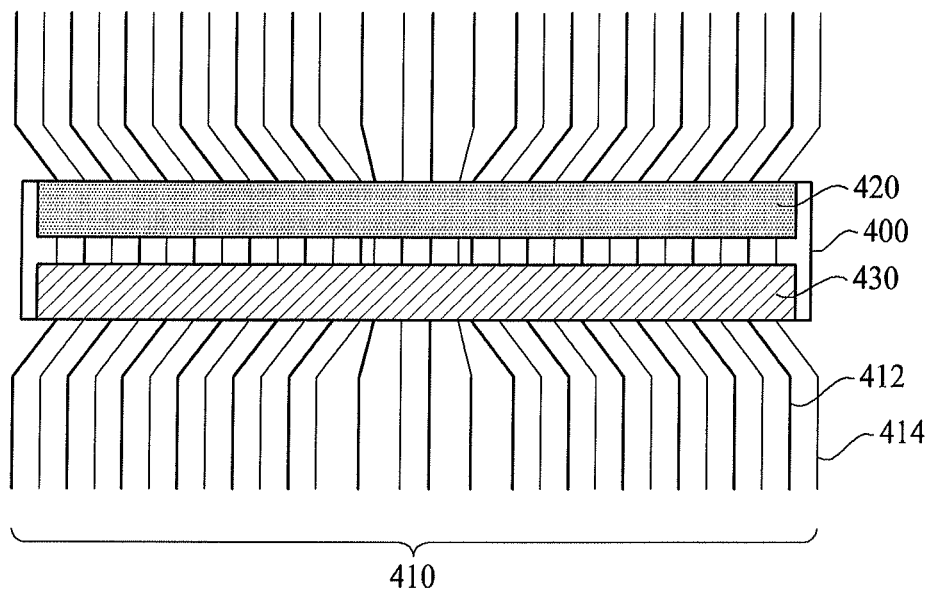

FIG. 5 is views illustrating a driving IC of the LCD device according to an embodiment of the present invention. In FIG. 5, one of the plurality of driving ICs 400 is illustrated. The plurality of driving ICs 400 may be provided in a chip-on glass (COG) type or a chip-on film (COF, chip-on flexible printed circuit) type.

Referring to FIG. 5A, in the driving IC 400 of the LCD device according to an embodiment of the present invention, a gate driving logic and a data driving logic are merged into one chip.

Referring to FIG. 5B, in the driving IC 400 of the LCD device according to an embodiment of the present invention, a data driving IC 420 and a gate driving IC 430 are merged into one chip.

The data driving logic or the data driving IC 420 generates analog data voltages supplied to the respective pixels by using a data control signal and digital image data which are applied from the control unit mounted on the PCB 300.

The gate driving logic or the gate driving IC 430 generates a scan signal (gate signal) for turning on a plurality of TFTs formed in the respective pixels, by using a gate control signal applied from the control unit mounted on the PCB 300.

A plurality of link lines 410 are formed at both sides of the driving IC 400. Here, the plurality of link lines 410 include a plurality of gate link lines 412 and a plurality of data link lines 414.

The driving IC 400 receives the gate control signal from the control unit through the plurality of gate link lines 412, and generates the scan signal on the basis of the gate control signal. The driving IC 400 supplies the generated scan signal to the pixels formed in the liquid crystal panel 100.

Moreover, the driving IC 400 receives the data control signal and the digital image data from the control unit through the data link lines 414, and generates analog data voltages on the basis of the data control signal and the digital image data. The driving IC 400 supplies the generated analog data voltages to the pixels formed in the liquid crystal panel 100.

The number of data lines DL formed in the liquid crystal panel 100 is not necessarily equal to that of first gate lines (VGL, vertical gate lines), and therefore, the number of gate link lines 412 is not equal to that of data link lines 414, and the gate link lines 412 and the data link lines 414 are not alternately disposed. For example, two data link lines 414 may be provided in correspondence with one gate link line 412 depending on pitches and resolution of the pixels.

Hereinafter, a structure of the liquid crystal panel 100 of the present invention will be described in detail with reference to the drawing.

Figure 6:
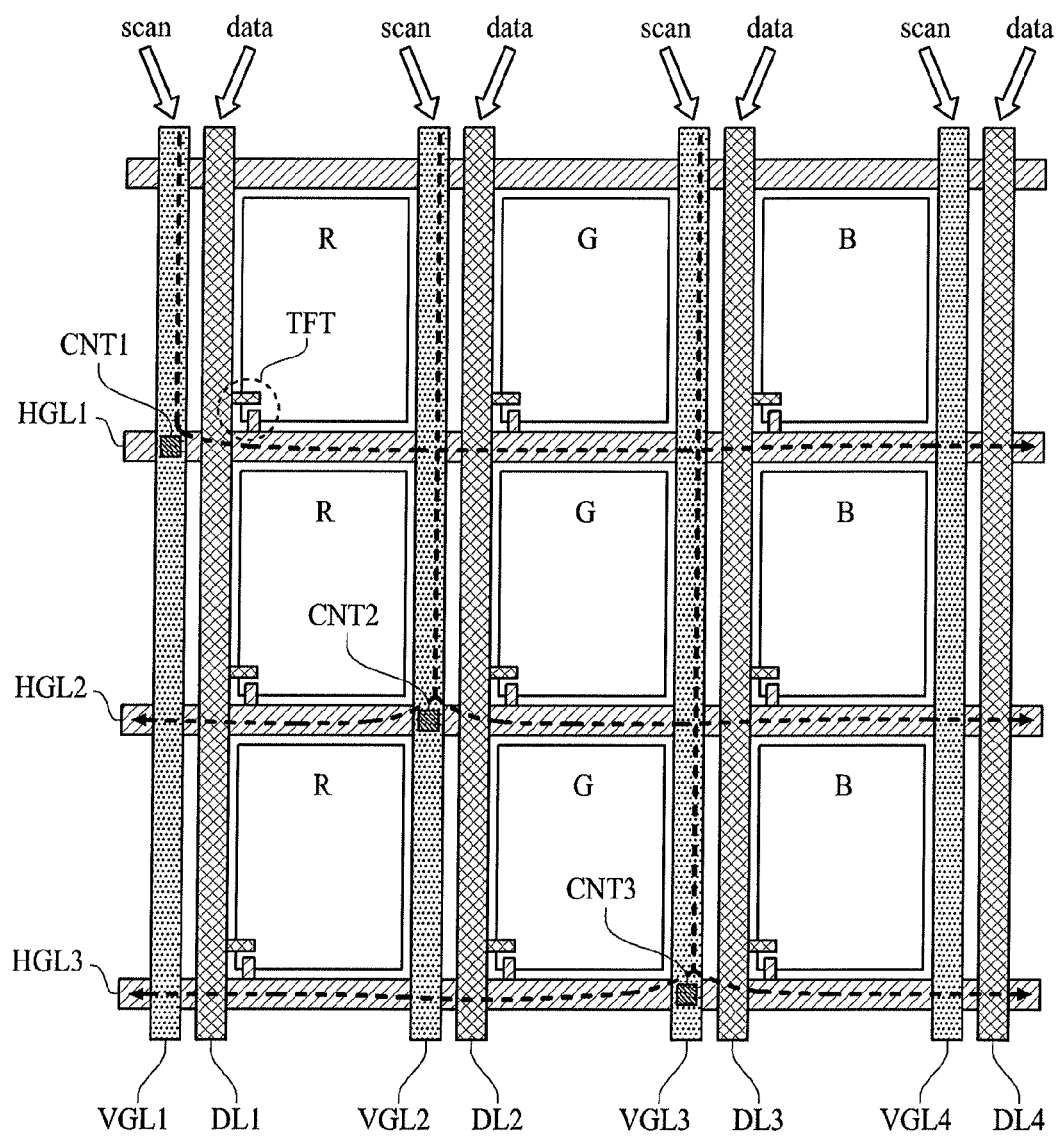
FIG. 6 is a view illustrating a pixel structure of an LCD device according to a first embodiment of the present invention.
Figure 7:
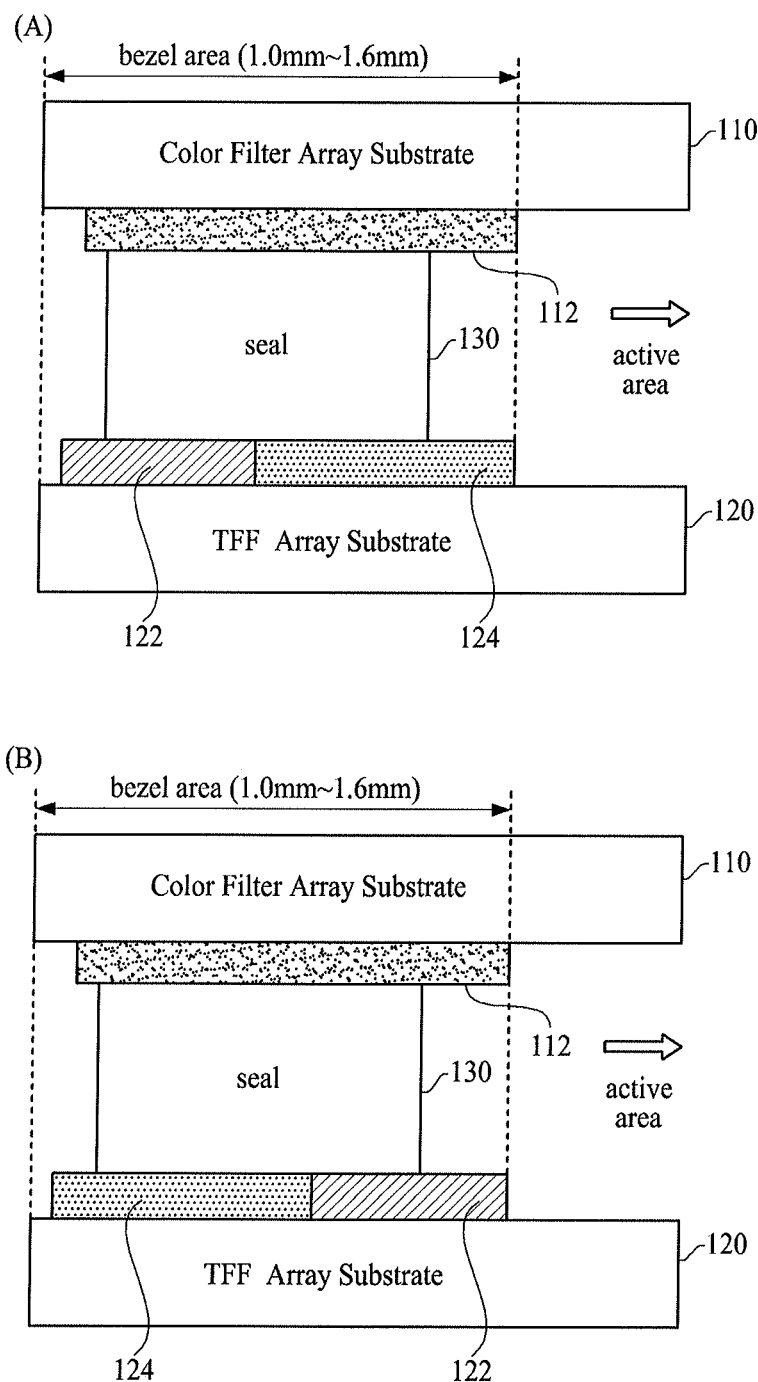
FIG. 7 is views for describing a left bezel size and right bezel size of the LCD device according to an embodiment of the present invention.

FIG. 6 is a view illustrating a pixel structure of an LCD device according to a first embodiment of the present invention, and FIG. 7 is views for describing a left bezel size and right bezel size of the LCD device according to an embodiment of the present invention.

Referring to FIGS. 6 and 7, the liquid crystal panel 100 includes an upper substrate (color filter array substrate) 110, a lower substrate (TFT array substrate) 120, and a liquid crystal layer disposed between the two substrates 110 and 120. The upper substrate 110 and the lower substrate 120 are coupled to each other with a seal 130.

The upper substrate 110 of the liquid crystal panel 100 includes a plurality of red (R), green (G), and blue color filters for displaying a color image, and a black matrix (BM) 112 that is formed between adjacent pixels to divide the pixels. Here, the black matrix (BM) is formed in plurality. In FIG. 7, a left non-display area of the liquid crystal panel 100 is illustrated, and thus, the color filters formed in an active area are not shown.

The lower substrate 120 of the liquid crystal panel 100 includes a display area (active area) in which the plurality of pixels for displaying an image are formed, and a non-display area in which a plurality of link lines linking the plurality of driving ICs 400 to the pixels are formed.

A plurality of first gate lines (vertical gate lines) VGL, a plurality of second gate lines (horizontal gate lines) HGL, and a plurality of data lines DL are formed in the active area of the TFT array substrate 120.

The plurality of pixels are defined by the plurality of first gate lines VGL, the plurality of second gate lines HGL, and the plurality of data lines DL. Each of the pixels includes a common electrode that receives a common voltage (Vcom), a pixel electrode that receives data voltage (Vdata), a storage capacitor (Cst), and a TFT that is a switching element.

Here, an active layer of the TFT may be formed of amorphous silicon (a-Si), low temperature poly silicon (LTPS), or indium gallium zinc oxide (IGZO).

The LCD device including the above-described elements changes alignment of liquid crystal with an electric field generated between paired pixel electrode and common electrode, and adjusts a transmittance of light supplied from the backlight unit by aligning the liquid crystal, thereby displaying an image.

As illustrated in FIGS. 4 and 5, the driving IC 400 in which the gate driving IC (or gate driving logic) and the data driving IC (or data driving logic) are merged into one chip is disposed at an upper side (or lower side) of the liquid crystal panel 100 in a planar view. Therefore, the present invention applies a new gate line structure, for supplying the scan signal to the pixels of the liquid crystal panel 100. In FIG. 4, the driving IC 400 is illustrated as being disposed at the upper side of the liquid crystal panel 100 in a planar view, but is not limited thereto. As another example, the driving IC 400 may be disposed at the lower side of the liquid crystal panel 100 in a planar view.

As illustrated in FIG. 6, the plurality of first gate lines VGL and the plurality of data lines DL are formed in parallel across a vertical direction in the liquid crystal panel 100. That is, the plurality of first gate lines VGL are formed in parallel and in the same direction as the plurality of data lines DL.

The plurality of second gate lines HGL are formed to intersect the plurality of first gate lines VGL and the plurality of data lines DL. That is, the plurality of gate lines HGL are formed in a horizontal direction.

To provide a detailed description, the plurality of first gate lines VGL and the plurality of data lines are vertically formed from an upper side to a lower side along to a long-axis direction of the liquid crystal panel 100. The plurality of second gate lines HGL are horizontally formed from a left side to a right side (or from a right side to a left side) along to a short-axis direction of the liquid crystal panel 100.

In the LCD device according to the first embodiment of the present invention, the vertically formed plurality of first gate lines VGL and the plurality of horizontally formed second gate lines HGL are formed of the same number in one-to-one correspondence relationship.

Here, the plurality of horizontally formed second gate lines HGL are disposed on a first layer in the liquid crystal panel, and the vertically formed plurality of first gate lines VGL and the vertically formed plurality of data lines DL are disposed on a second layer in the liquid crystal panel.

The vertically formed plurality of first gate lines VGL and the plurality of second gate lines HGL are disposed on different layers in the liquid crystal panel with an insulating layer therebetween, but the plurality of first gate lines VGL and the plurality of second gate lines HGL are selectively brought into contact with each other through a contact CNT in an overlapping area therebetween. That is, the plurality of first gate lines VGL and the plurality of second gate lines HGL are electrically connected to each other by pair through the contact CNT in the overlapping area therebetween.

Specifically, a vertically formed first-order first gate line VGL1 and a horizontally formed first-order second gate line HGL1 are electrically connected to each other through a first contact CNT1 in an overlapping area therebetween. Like this, a pair of vertical gate line and horizontal gate line, namely, the first-order vertical gate line VGL1 and the first-order horizontal gate line HGL1 are electrically connected to each other through the first contact CNT1.

A vertically formed second-order first gate line VGL2 and a horizontally formed second-order second gate line HGL2 are electrically connected to each other through a second contact CNT2 in an overlapping area therebetween. Like this, a pair of vertical gate line and horizontal gate line, namely, the second-order vertical gate line VGL2 and the second-order horizontal gate line HGL2 are electrically connected to each other through the second contact CNT2.

A vertically formed third-order first gate line VGL3 and a horizontally formed third-order second gate line HGL3 are electrically connected to each other through a third contact CNT3 in an overlapping area therebetween. Like this, a pair of vertical gate line and horizontal gate line, namely, the third-order vertical gate line VGL3 and the third-order horizontal gate line HGL3 are electrically connected to each other through the third contact CNT3.

In the same structure as the above-described structure, n number of first gate lines VGL and n number of second gate lines HGL are paired and electrically connected to each other through a contact.

The above-described expressions of first-order, second-order, and third-order are for describing an order and relationship between a plurality of lines, and the expression of first-order does not denote a first-order line of all lines but is for describing the present invention with reference to the drawing. Hereinafter, the expressions of first-order, second-order, and third-order are also applied identically to contents of the specification.

The vertically formed plurality of first gate lines VGL are respectively connected to the plurality of gate link lines 412 illustrated in FIG. 5. Thus, the scan signal output from the driving IC 400 is applied to the plurality of first gate lines VGL. The scan signal is supplied to the TFTs of the pixels formed in the liquid crystal panel 100 via the plurality of second gate lines HGL connected to the plurality of first gate lines VGL, thereby turning on the TFTs. At this time, the scan signal is sequentially supplied to all the pixels of the liquid crystal panel 100 in units of one horizontal line.

The vertically formed plurality of data lines DL are respectively connected to the plurality of data link lines 414 illustrated in FIG. 5. Thus, data voltages (Vdata) output from the driving IC 400 are applied to the respective data lines DL.

When a data voltage (Vdata) is supplied to a source electrode of a specific TFT formed in the liquid crystal panel 100 via a corresponding data line DL to turn on the TFT, the data voltage (Vdata) supplied to the source electrode is supplied to a pixel electrode via a drain electrode.

In the LCD device according to an embodiment of the present invention, the driving IC 400 in which the gate driving IC (or gate driving logic) and the data driving IC (or data driving logic) are merged into one chip is disposed at the upper side of the liquid crystal panel 100 in a planar view.

By applying the scan signal to a pixel through a vertically formed first gate line and applying a data voltage (Vdata) to the pixel through a vertically formed data line, a link line and a GIP logic can be removed from the left and right non-display areas of the related art liquid crystal panel.

Accordingly, as illustrated in FIG. 7, only a common voltage link area 122 is formed in the left non-display area of the liquid crystal panel 100, and only a ground link area 124 is formed in the right non-display area of the liquid crystal panel 100, thus decreasing a bezel width to 1.0 mm to 1.6 mm.

Here, as illustrated in FIG. 7A, the common voltage link area 122 may be formed to overlap the seal 130. As illustrated in FIG. 7B, the ground voltage link area 124 may be formed to overlap the seal 130. Also, the common voltage link area 122 and the ground voltage link area 124 are formed to have a minimum of bezel width margin necessary for coupling of the upper substrate 110 and the lower substrate 120, thereby realizing a narrow bezel.

Here, the left bezel width and right bezel width of the liquid crystal panel 100 may be affected by the line width of the seal used to couple the upper and lower substrates, and thus, since the line width of the seal can be realized to less than 1 mm at the present technical level, the left bezel width and right bezel width of the LCD device according to the embodiments of the present invention can be sufficiently reduced to 1 mm or less. When technology of controlling the line width of the seal is more advanced in the future, the left bezel width and right bezel width of the LCD device according to the embodiments of the present invention can decrease.

Figure 8:
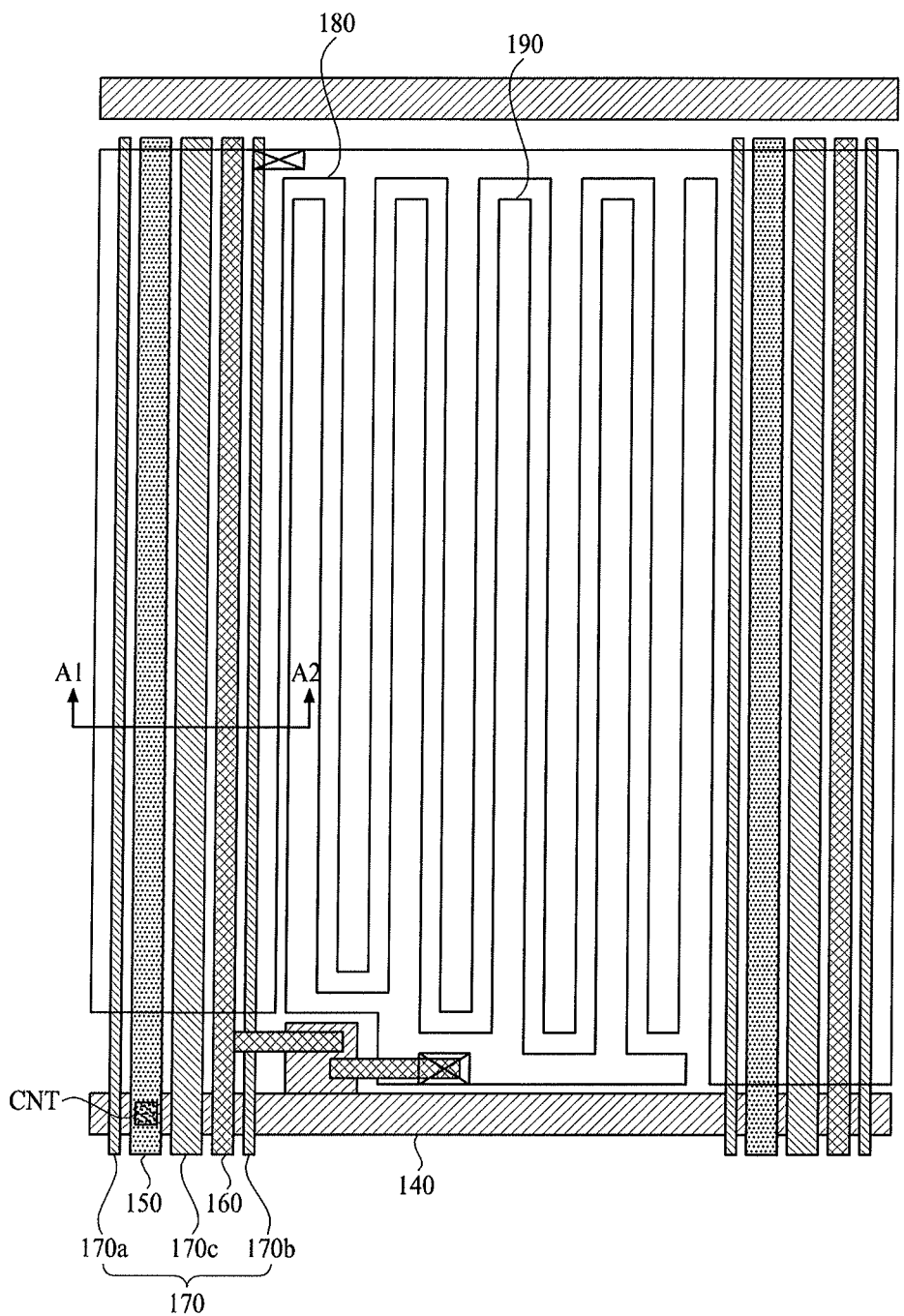
FIG. 8 is a view specifically illustrating the pixel structure of the LCD device according to the first embodiment of the present invention.
Figure 9:
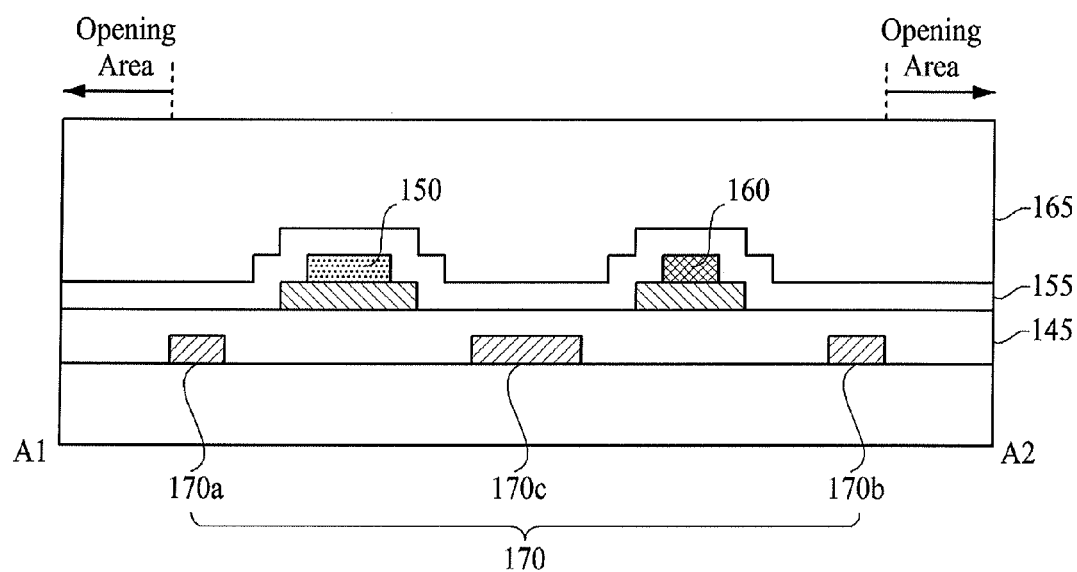
FIG. 9 is a sectional view taken along A1-A2 line of FIG. 8.

FIG. 8 is a view specifically illustrating the pixel structure of the LCD device according to the first embodiment of the present invention, and FIG. 9 is a sectional view taken along A1-A2 line of FIG. 8. In FIG. 8, it is illustrated that the pixels have a single domain and a square and rectangular shape, but is not limited thereto. The pixels may be formed to have a multi-domain.

Referring to FIGS. 8 and 9, a common electrode 180 receiving the common voltage (Vcom) and a pixel electrode 190 receiving a data voltage (Vdata) are formed in each pixel of the liquid crystal panel 100.

In FIGS. 8 and 9, a pixel structure driven in the IPS mode is illustrated, and thus, the common electrode 180 and the pixel electrode 190 are disposed on the same layer. In addition, the common electrode 180 and the pixel electrode are patterned in a finger shape, and are formed in order for the patterns to intersect each other.

A horizontal gate line 140 is provided in a width direction (X-axis direction), and a data line 160 and a vertical gate line 150 are provided in a length direction (Y-axis direction).

Two common voltage lines 170 for applying the common voltage (Vcom) to the common electrode 180 of each pixel are vertically disposed in parallel with and next to the vertical gate line 150 and data line 160 disposed therebetween.

A first common voltage line 170a is disposed next to the vertical gate line 150, a second common voltage line 170b is disposed next to the data line 160, and a third common voltage line 170c is disposed between the vertical gate line 150 and the data line 160.

Although the first to third common voltage lines 170a to 170c are separated from each other, the first to third common voltage lines 170a to 170c contact the common line (not shown) which is formed in parallel and in the same direction as the horizontal gate line 140, and the same common voltage (Vcom) is supplied to the first to third common voltage lines 170a to 170c.

As illustrated in FIG. 9, the data line 160 and the vertical gate line 150 are formed on the same layer, and the common voltage line 170 is formed on a layer thereunder. That is, the common voltage line 170 is formed on the first layer in the liquid crystal panel, and the data line 160 and the vertical gate line 150 are formed on the second layer in the liquid crystal panel. Active layers may be formed under the vertical gate line 150 and the data line 160.

Although not shown in the sectional view of FIG. 9 (A1-A2 line of FIG. 8), the horizontal gate line 140 is formed under the layer on which the data line 160 and the vertical gate line 150 are formed. Thus, the horizontal gate line 140 and the vertical gate line 150 are formed on different layers, and electrically connected through a contact.

Here, the common voltage line 170 is formed on the first layer, and a gate insulating layer 145 is formed thereon. The vertical gate line 150 and the data line 160 are formed on the second layer on the gate insulating layer 145.

Here, an active pattern remains in a process that forms a TFT under the vertical gate line 150 and data line 160. This is because a source electrode and drain electrode of the TFT, the vertical gate line 150, and the data line 160 are formed in a single process. Even in the following embodiment, the active pattern of the TFT can remain under a specific line.

A passivation layer 155 is formed to cover the vertical gate line 150 and the data line 160, and a planarization layer 165 is formed of photoacryl (PAC) on the passivation layer 155. Although not shown in the drawing, the common electrode 180 and the pixel electrode 190 are formed on the planarization layer 165.

A gate driving voltage of the scan signal applied from the driving IC 400 to the vertical gate line 150 may be applied at −5 V to +30 V. At this time, due to a high-voltage scan signal, coupling stronger than an electric field generated by a data voltage (Vdata) applied to the data line 160 can be formed in a long-axis direction of each pixel.

Therefore, a leakage of light can occur in the pixels, and particularly, a black image cannot accurately be displayed, causing a reduction in a contrast ratio. To solve such problems, the third common voltage line 170c is formed between the vertical gate line 150 and the data line 160.

Although the lines are disposed on different layers, since the third common voltage line 170c is disposed between the vertical gate line 150 and the data line 160, the common voltage (Vcom) of −2 V to +3 V can prevent the coupling of electric fields from occurring in the long-axis direction of each pixel due to a high-voltage scan signal.

That is, an electric field caused by the high-voltage scan signal applied to the plurality of first gate lines VGL can be counteracted using the third common voltage line 170c disposed between the plurality of first gate lines VGL and the plurality of data lines DL.

In the pixel structure of the LCD device according to the first embodiment of the present invention illustrated in FIGS. 8 and 9, an aperture ratio of each pixel can decrease by a certain degree due to the vertically formed plurality of first gate lines VGL and the third common voltage line 170c. To solve such a problem, as illustrated in FIGS. 10 and 11, a pixel structure is changed.

Figure 10:
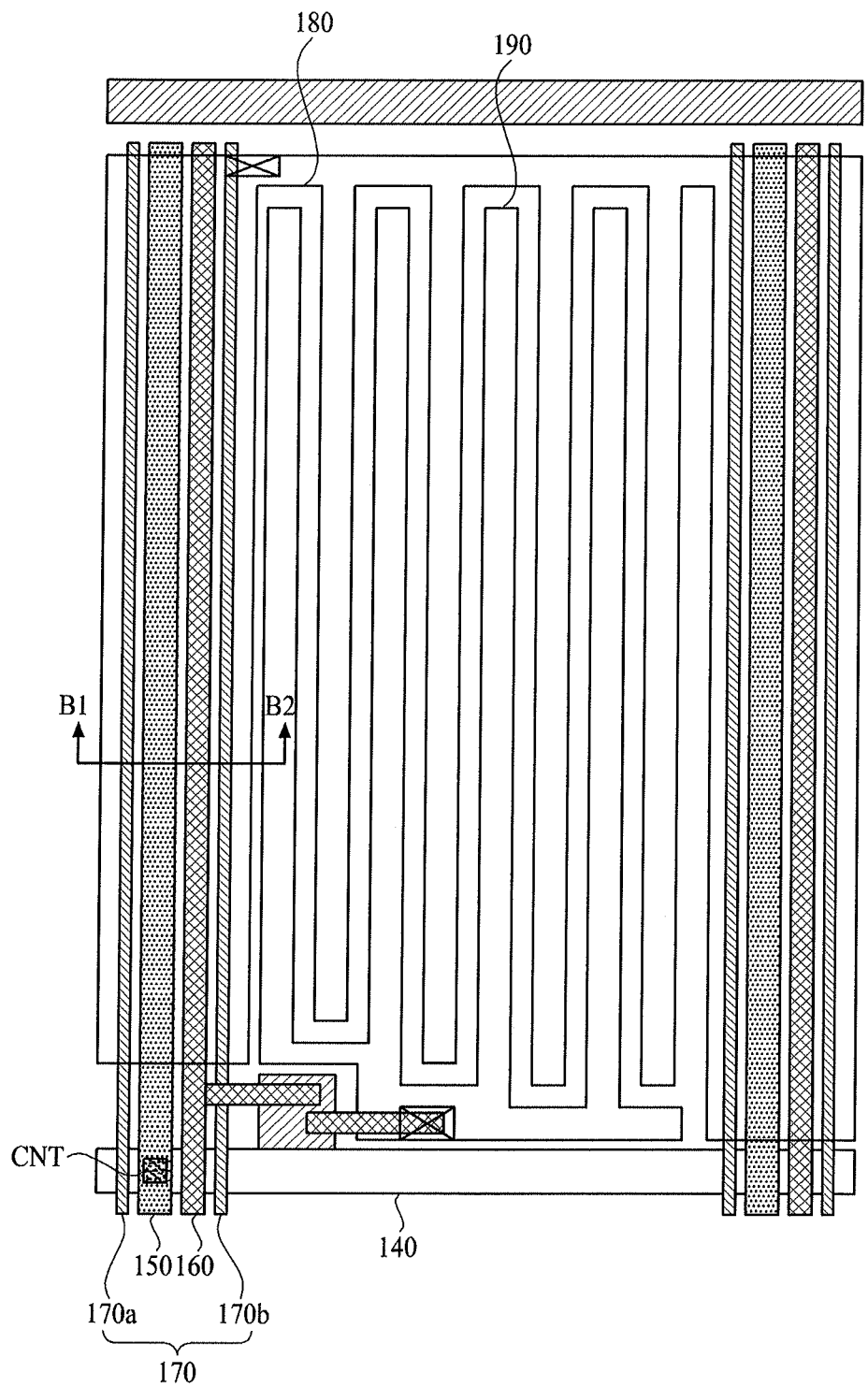
FIG. 10 is a view specifically illustrating a pixel structure of an LCD device according to a second embodiment of the present invention.

FIG. 10 is a view specifically illustrating a pixel structure of an LCD device according to a second embodiment of the present invention. FIG. 11 is a sectional view taken along B1-B2 line of FIG. 10, and is a view illustrating an opening area of each pixel being enlarged;

In FIG. 10, it is illustrated that the pixels have a single domain and a square and rectangular shape, but is not limited thereto. The pixels may be formed to have a multi-domain.

Figure 11:
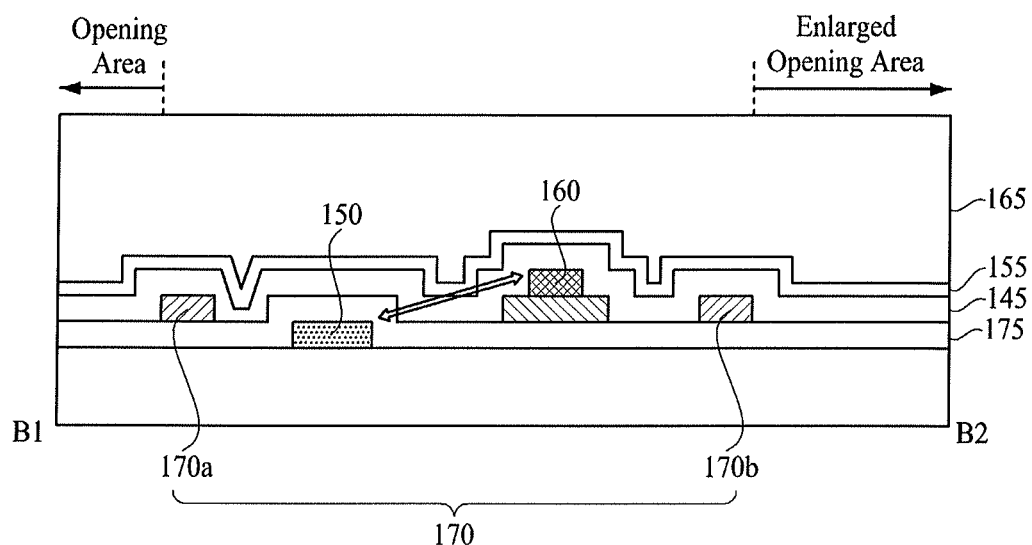
FIG. 11 is a sectional view taken along B1-B2 line of FIG. 10, and is a view illustrating an opening area of each pixel being enlarged.

Referring to FIGS. 10 and 11, the common electrode 180 receiving the common voltage (Vcom) and a pixel electrode 190 receiving a data voltage (Vdata) are formed in each pixel of the liquid crystal panel 100.

In FIGS. 10 and 11, a pixel structure driven in the IPS mode is illustrated, and thus, the common electrode 180 and the pixel electrode 190 are disposed on the same layer. In addition, the common electrode 180 and the pixel electrode are patterned in a finger shape, and are formed in order for the patterns to intersect each other.

The horizontal gate line 140 is provided in a width direction (X-axis direction), and the data line 160 and the vertical gate line 150 are provided in a length direction (Y-axis direction).

Two common voltage lines 170 for applying the common voltage (Vcom) to the common electrode 180 of each pixel are vertically disposed in parallel with and next to the vertical gate line 150 and data line 160 disposed therebetween.

A first common voltage line 170a is disposed next to the vertical gate line 150, and a second common voltage line 170b is disposed next to the data line 160.

That is, the vertical gate line 150 and the data line 160 are paired and vertically formed in parallel, a first common voltage line 170a is formed next to the vertical gate line 150, and a second common voltage line 170b is formed next to the data line 160.

Although the first and second common voltage lines 170a and 170b are separated from each other, the first and second common voltage lines 170a and 170b contact a common line (not shown) which is formed in parallel and in the same direction as the horizontal gate line 140, and the same common voltage (Vcom) is supplied to the first and second common voltage lines 170a and 170b.

As illustrated in FIG. 11, the vertical gate line 150 is formed on the first layer, and an insulating layer 175 is formed to cover the vertical gate line 150. The data line 160 and the common voltage line 170 are formed on the second layer on the insulating layer 175.

The gate insulating layer 145 is formed to cover the data line 160 and the common voltage line 170, and the passivation layer 155 is formed thereon. The planarization layer 165 is formed of photoacryl (PAC) on the passivation layer 155. Although not shown in the drawing, the common electrode 180 and the pixel electrode 190 are formed on the planarization layer 165.

Although not shown in the sectional view of FIG. 11 (B1-B1 line of FIG. 10), the horizontal gate line 140 and the vertical gate line 150 are formed on different layers, and electrically connected through a contact.

In comparison with the pixel structure of FIG. 9, in the pixel structure of FIG. 11, the vertical gate line 150 and the data line 160 are formed on different layers for enlarging an opening area.

In the pixel structure of FIG. 9, by removing the third common voltage line 170c which is formed between the vertical gate line 150 and the data line 160, an opening area is enlarged by an area which is occupied by the third common voltage line 170c before. Accordingly, in comparison with the first embodiment, an aperture ratio of each pixel can increase in the second embodiment.

In the LCD device according to the embodiments of the present invention, an aperture ratio of each pixel increases, thus increasing a luminance of an image. Also, the number of backlight components is reduced in proportion to the increased luminance, thus reducing the manufacturing cost.

In the pixel structures of FIGS. 10 and 11, although the third common voltage line 170c is not formed between the vertical gate line 150 and the data line 160, since the vertical gate line 150 and the data line 160 are formed on different layers and separated from each other in a diagonal direction, an influence of an electric field due to a high-voltage scan signal can be reduced.

Figure 12:
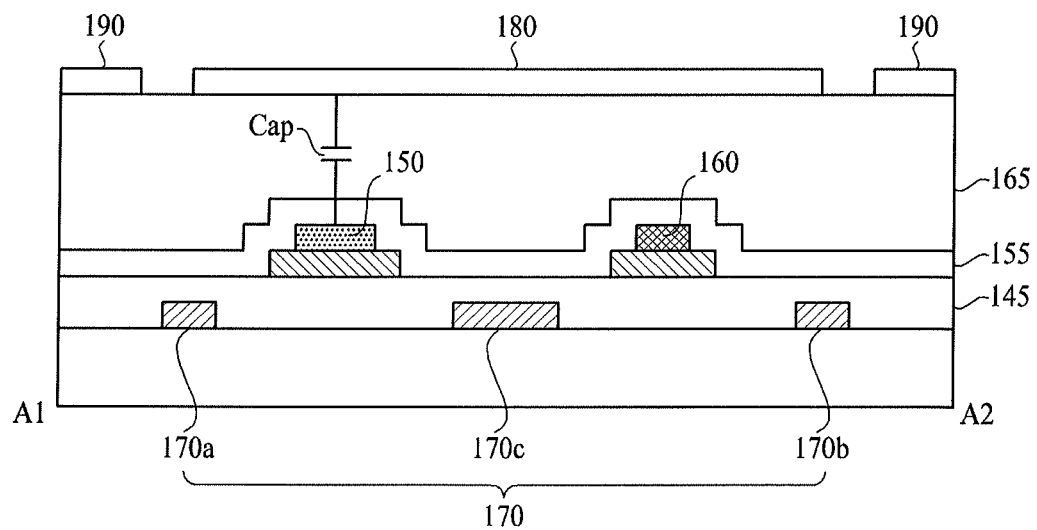
FIG. 12 is a view illustrating a parasitic capacitance being generated between a vertical gate line and a common electrode, in the pixel structure according to the first embodiment of the present invention.
Figure 13:
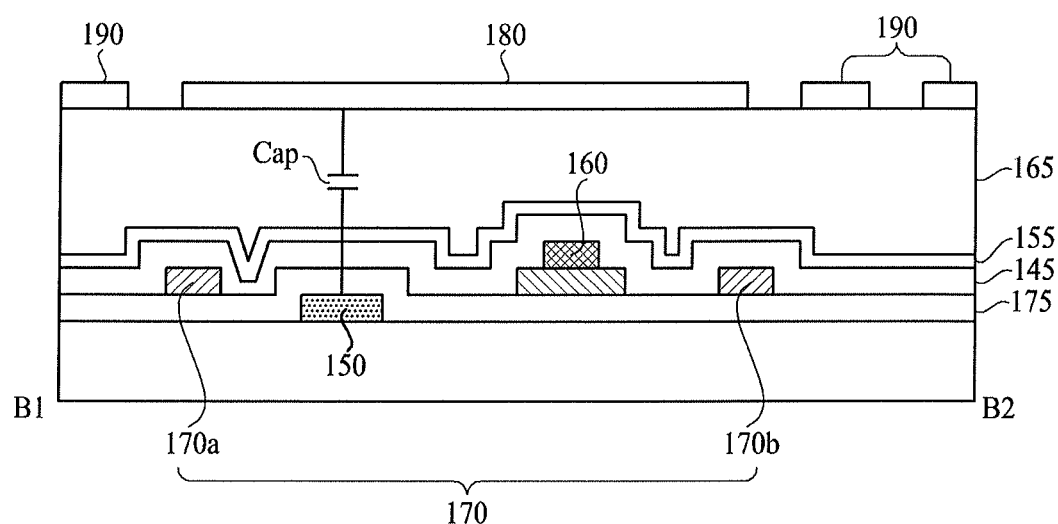
FIG. 13 is a sectional view illustrating a pixel structure of an LCD device according to a third embodiment of the present invention.

FIG. 12 is a view illustrating a parasitic capacitance being generated between a vertical gate line and a common electrode, in the pixel structure according to the first embodiment of the present invention. FIG. 13 is a sectional view illustrating a pixel structure of an LCD device according to a third embodiment of the present invention.

First, referring to FIG. 12, the common voltage line 170 is formed on the first layer, and when the vertical gate line 150 and the data line 160 are formed on the second layer, a parasitic capacitance can be generated between the vertical gate line 150 and the common electrode 180 with the passivation layer 155 and planarization layer 165 therebetween.

Since the vertical gate line 150 is formed along a long axis of a pixel, a high parasitic capacitance can be generated. The scan signal applied to the vertical gate line 150 may be delayed due to the high parasitic capacitance when being applied to a corresponding pixel, and can obstruct a normal operation of a TFT formed in the pixel. To solve such an effect by the high parasitic capacitance, as illustrated in FIG. 13, a pixel structure may be changed.

Referring to FIG. 13, the vertical gate line 150 is formed on the first layer, and an insulating layer 175 is formed to cover the vertical gate line 150. A data line 160 and a common voltage line 170 are formed on the second layer on the insulating layer 175.

The gate insulating layer 145 is formed to cover the data line 160 and the common voltage line 170, and the passivation layer 155 is formed thereon. The passivation layer 165 is formed of photoacryl (PAC) on the passivation layer 155. The common electrode 180 and the pixel electrode 190 are formed on the passivation layer 165.

Although not shown in the sectional view of FIG. 13, the horizontal gate line 140 and the vertical gate line 150 are formed on different layers, and electrically connected through a contact.

In comparison with the pixel structure of FIG. 13, in the pixel structure of FIG. 12, since the vertical gate line 150 is formed on the second layer close to the common electrode 180, a high parasitic capacitance can be generated.

On the other hand, in the pixel structure of FIG. 13, the vertical gate line 150 is formed as the first layer to become far away from the common electrode 180, and can reduce the amount of parasitic capacitance generated between the common electrode 180 and the vertical gate line 150 as compared with the structure of FIG. 12.

In the pixel structure of FIG. 12, the passivation layer 155 and the planarization layer 165 are formed between the common electrode 180 and the vertical gate line 150, but in the pixel structure of FIG. 13, the insulating layer 175, the gate insulating layer 145, the passivation layer 155, and the planarization layer 165 are formed between the common electrode 180 and the vertical gate line 150, thus decreasing the amount of parasitic capacitance.

Figure 14:
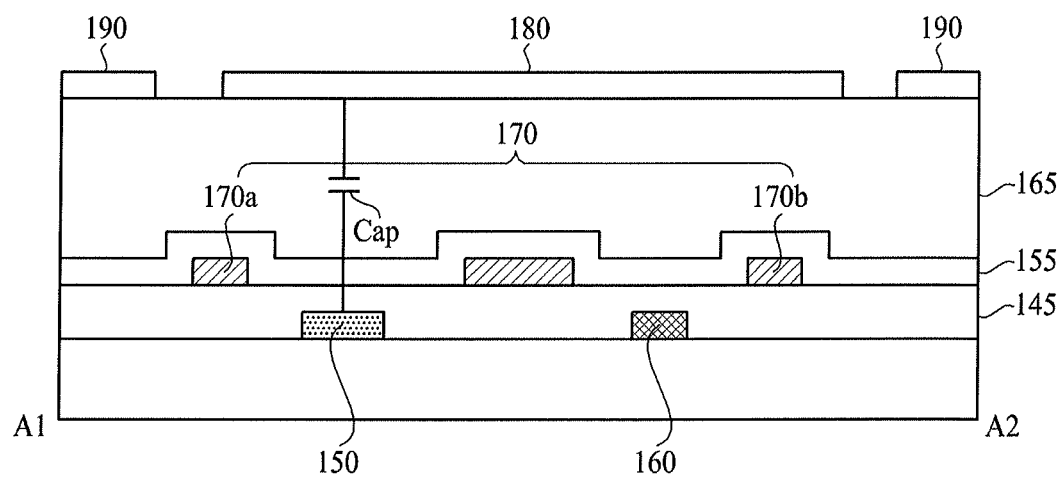
FIG. 14 is a sectional view illustrating a pixel structure of an LCD device according to a fourth embodiment of the present invention.

FIG. 14 is a sectional view illustrating a pixel structure of an LCD device at the same position of the liquid crystal panel shown in FIG. 13 according to a fourth embodiment of the present invention.

Referring to FIG. 14, the vertical gate line 150 and the data line 160 are formed on the first layer, and the gate insulating layer 145 is formed to cover the vertical gate line 150 and the data line 160. The common voltage line 170 is formed on the second layer on the gate insulating layer 145.

The passivation layer 155 is formed to cover the common voltage line 170, and the planarization layer 165 is formed of photoacryl (PAC) on the passivation layer 155. The common electrode 180 and the pixel electrode 190 are formed on the planarization layer 165.

Although not shown in the sectional view of FIG. 14, the horizontal gate line 140 and the vertical gate line 150 are formed on different layers, and electrically connected through a contact.

In the pixel structure of FIG. 14, the vertical gate line 150 is formed as the first layer to become far away from the common electrode 180, and can reduce the amount of parasitic capacitance generated between the common electrode 180 and the vertical gate line 150.

In the pixel structure of FIG. 14, the gate insulating layer 145, the passivation layer 155, and the planarization layer 165 are formed between the common electrode 180 and the vertical gate line 150, thus decreasing the amount of parasitic capacitance.

Figure 15:
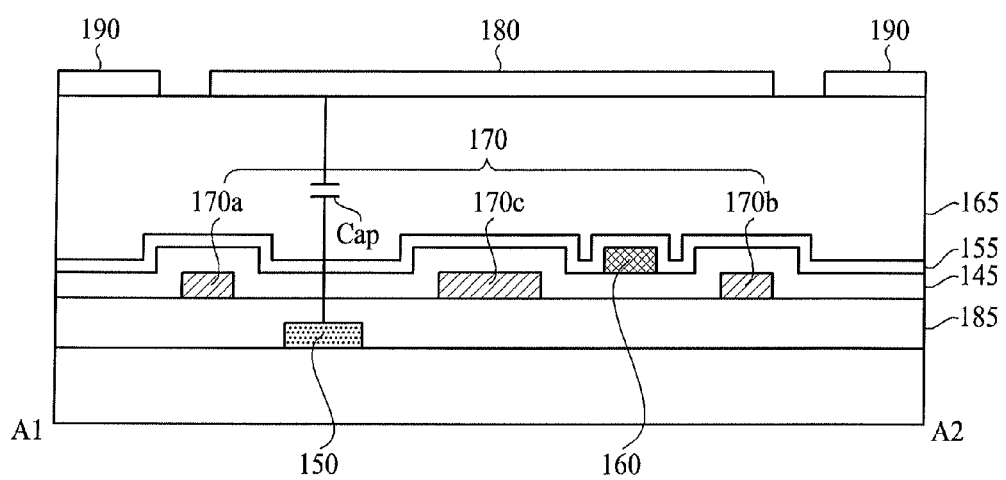
FIG. 15 is a sectional view illustrating a pixel structure of an LCD device according to a fifth embodiment of the present invention.

FIG. 15 is a sectional view illustrating a pixel structure of an LCD device at the same position of the liquid crystal panel shown in FIG. 14 according to a fifth embodiment of the present invention.

Referring to FIG. 15, the vertical gate line 150 is formed on the first layer, and the insulating layer 185 is formed to cover the vertical gate line 150. The common voltage line 170 is formed on the second layer on the insulating layer 185, and the gate insulating layer 145 is formed on the second layer to cover the common voltage line 170.

The data line 160 is formed on a third layer on the gate insulating layer 145, and the passivation layer 155 is formed to cover the common voltage line 170. The planarization layer 165 is formed of photoacryl (PAC) on the passivation layer 155. The common electrode 180 and the pixel electrode 190 are formed on the planarization layer 165.

Although not shown in the sectional view of FIG. 15, the horizontal gate line 140 and the vertical gate line 150 are formed on different layers, and electrically connected through a contact.

In the pixel structure of FIG. 15, the vertical gate line 150 is formed as the first layer to become far away from the common electrode 180, and can reduce the amount of parasitic capacitance generated between the common electrode 180 and the vertical gate line 150.

In the pixel structure of FIG. 15, the insulating layer 185, the gate insulating layer 145, the passivation layer 155, and the planarization layer 165 are formed between the common electrode 180 and the vertical gate line 150, thus decreasing the amount of parasitic capacitance.

Moreover, as illustrated in FIGS. 11, 13 and 15, the vertical gate line 150 and the data line 160 which are formed in parallel across a vertical direction are formed on different layers, a short circuit of the vertical gate line 150 and data line 160 due to a foreign material can be prevented in a manufacturing process, thus increasing a process efficiency and a manufacturing yield rate.

Figure 16:
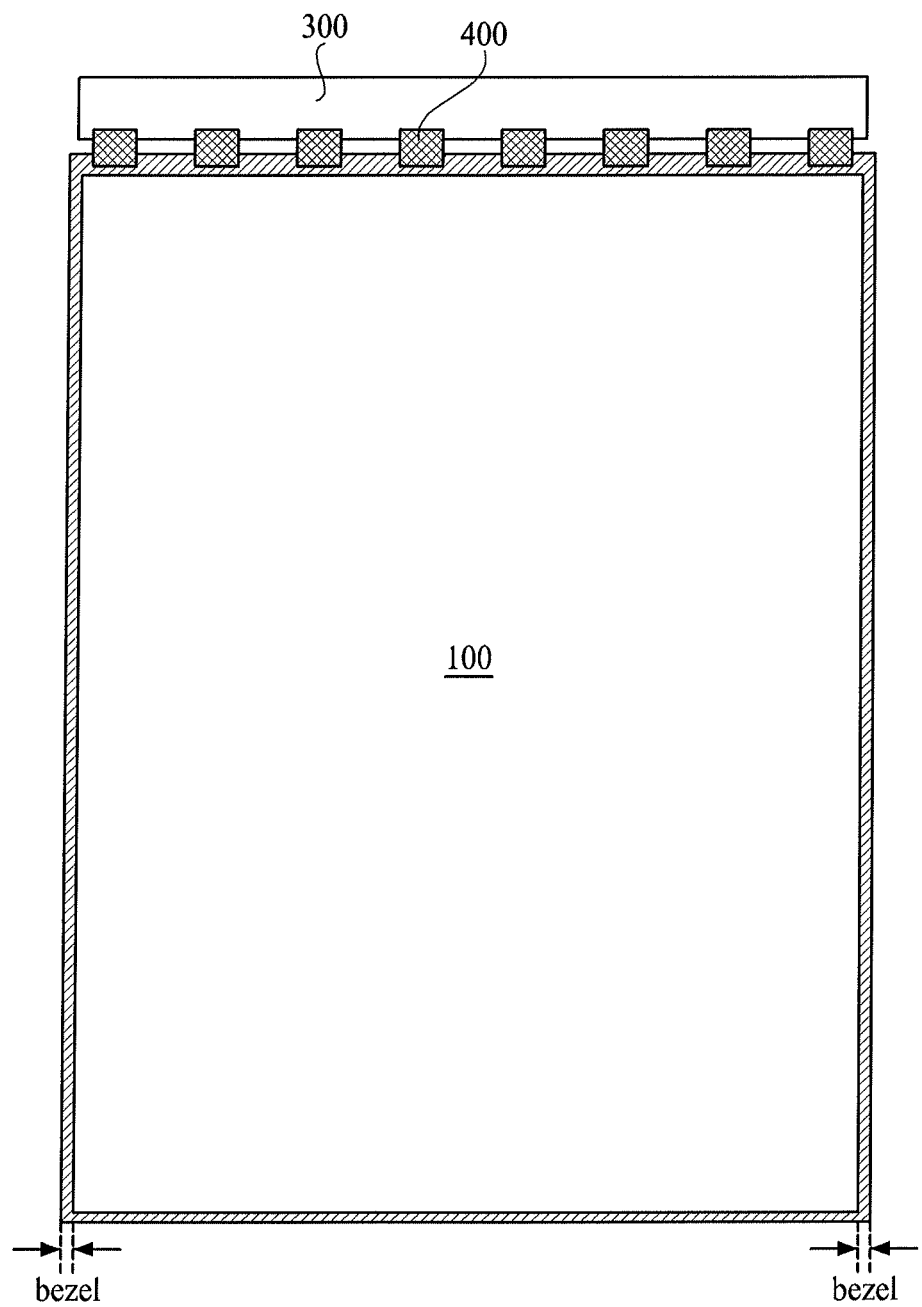
FIG. 16 is a view illustrating a liquid crystal panel being long provided in a vertical direction, in another embodiment of the present invention.

FIG. 16 is a view illustrating a liquid crystal panel having a long side in a vertical direction, in another embodiment of the present invention.

Referring to FIG. 16, by rotating the structure of FIG. 4 by 90 degrees, a screen may be long displayed in the vertical direction. In this case, the plurality of driving ICs 400 are disposed at the upper side of the liquid crystal panel 100 in a planar view.

Here, the plurality of first gate lines VGL and the plurality of data lines DL are vertically formed from the upper side to the lower side along the long-axis direction of the liquid crystal panel 100. The plurality of second gate lines HGL are horizontally formed from the left side to the right side (or from the right side to the left side) along the short-axis direction of the liquid crystal panel 100. Contacts between the plurality of vertically formed first gate lines VGL and the plurality of horizontally formed second gate lines HGL may be made identically to the above description of FIG. 6.

Even in the LCD device according to another embodiment of the present invention illustrated in FIG. 16, identically to the above-described embodiment, the link line and the GIP logic can be removed from the left and right non-display areas of the related art liquid crystal panel. Accordingly, only the common voltage link area 122 is formed in the left non-display area of the liquid crystal panel 100, and only the ground link area 124 is formed in the right non-display area of the liquid crystal panel 100, thus decreasing a bezel width to 1.0 mm to 1.6 mm.

As described above, in the LCD device according to the embodiments of the present invention, the left and right sizes of the bezel formed to surround the non-display area of the liquid crystal panel can be reduced. According to the present invention, by decreasing the bezel size to about 1 mm, a relatively broader display screen can be provided to users, and the aesthetic design appearance of the LCD device can be enhanced.

In the LCD device according to the embodiments of the present invention, the size of the bezel formed at the outer portion of the liquid crystal panel can be reduced.

In the LCD device according to the embodiments of the present invention, an aesthetic design appearance can be enhanced.

In the LCD device according to the embodiments of the present invention, a narrow bezel and a borderless panel can be implemented such that the lower instrument, left instrument, and right instrument of the liquid crystal panel are not exposed to the front.

In the LCD device according to the embodiments of the present invention, an aperture ratio of each pixel increases, thus increasing a luminance of an image. Also, the number of backlight components is reduced, thus reducing the manufacturing cost.

In the LCD device according to the embodiments of the present invention, the size of the pad area can be reduced.

In the LCD device according to the embodiments of the present invention, the manufacturing cost can be reduced.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) device, comprising:
   a plurality of vertical gate lines and a plurality of data lines arranged in a first direction in a liquid crystal panel;
   a plurality of horizontal gate lines arranged in a second direction perpendicular to the first direction in the liquid crystal panel, the plurality of horizontal gate lines and the plurality of vertical gate lines being on different layers and extending through a display area in which a plurality of pixels are defined; and
   a plurality of driving ICs disposed in an upper or lower non-display area of the liquid crystal panel, connected to the plurality of vertical gate lines to supply a scan signal, and connected to the plurality of data lines to supply data voltages,
   wherein the plurality of vertical gate lines and the plurality of horizontal gate lines are electrically connected to each other in pairs through a contact in an overlapping area therebetween, and
   wherein the plurality of vertical gate lines and the plurality of data lines directly contact a same upper surface of a same layer.

2. The LCD device of claim 1, further comprising a plurality of common voltage lines,
   wherein the plurality of common voltage lines are disposed above the vertical gate lines and the data lines.

3. The LCD device of claim 2, further comprising:
   a gate insulating layer on the vertical gate lines and the data lines and a passivation layer on the common voltage lines; and
   a planarization layer on the passivation layer.

4. The LCD device of claim 1, further comprising a plurality of common voltage lines on a first layer in the liquid crystal panel,
   wherein the plurality of vertical gate lines and the plurality of data lines are on a second layer in the liquid crystal panel above the first layer.

5. The LCD device of claim 4, further comprising:
   a gate insulating layer between the first layer and the second layer;
   a passivation layer on the data lines and the common voltage lines; and
   a planarization layer on the passivation layer.

6. The LCD device of claim 1, further comprising a plurality of common voltage lines,
   wherein,
   the plurality of vertical gate lines and the plurality of data lines are on a first layer in the liquid crystal panel, and
   the plurality of common voltage lines are on a second layer in the liquid crystal panel above the first layer.

7. The LCD device of claim 6, further comprising:
   a gate insulating layer between the first layer and the second layer;
   a passivation layer on the common voltage lines; and
   a planarization layer on the passivation layer.

8. The LCD device of claim 1, further comprising a plurality of common voltage lines, wherein, the plurality of vertical gate lines are on a first layer in the liquid crystal panel, the plurality of common voltage lines are on a second layer in the liquid crystal panel above the first layer, and the plurality of data lines are on a third layer in the liquid crystal panel above the second layer.

9. The LCD device of claim 8, further comprising:

a gate insulating layer between the first layer and the second layer;

a passivation layer between the second layer and the third layer; and an insulating layer and a planarization layer on the data lines.

10. The LCD device of claim 2, wherein the plurality of common voltage lines are arranged in the first direction and parallel to the plurality of vertical gate lines and the plurality of data lines.

11. The LCD device of claim 2, wherein each of the vertical gate lines is spaced from a corresponding data line in the second direction with one of the common voltage lines disposed therebetween.

12. The LCD device of claim 3, wherein the gate insulating layer has an upper surface and the plurality of common voltage lines are disposed on the upper surface of the gate insulating layer.

13. The LCD device of claim 2, wherein the common voltage lines include a first common voltage line, a second common voltage line, and a third common voltage line, wherein each of the vertical gate lines is disposed between a corresponding first common voltage line and a corresponding third common voltage line, and each of the data lines is disposed between the corresponding third common voltage line and a corresponding second common voltage line.

14. The LCD device of claim 1, further comprising a common electrode that overlaps the plurality of vertical gate lines and the plurality of data lines.

15. The LCD device of claim 3, further comprising a common electrode and a pixel electrode disposed on an upper surface of the planarization layer.

* * * * *